(12) United States Patent
Kim et al.

(10) Patent No.: US 7,359,600 B2
(45) Date of Patent: Apr. 15, 2008

(54) LOOSE TUBE OPTICAL CABLE HAVING STRAIGHT AGGREGATION STRUCTURE

(75) Inventors: Tae-Gyoung Kim, Busan (KR); Min Son, Gyeongsangbuk-do (KR)

(73) Assignee: LS Cable Ltd., Seoul (KR)

( * ) Notice: Subject to any disclaimer, the term of this patent is extended or adjusted under 35 U.S.C. 154(b) by 187 days.

(21) Appl. No.: 10/545,407

(22) PCT Filed: Apr. 8, 2003

(86) PCT No.: PCT/KR03/00697

§ 371 (c)(1),
(2), (4) Date: Aug. 9, 2005

(87) PCT Pub. No.: WO2004/072991

PCT Pub. Date: Aug. 26, 2004

(65) Prior Publication Data

US 2006/0153510 A1    Jul. 13, 2006

(30) Foreign Application Priority Data

Feb. 14, 2003 (KR) .................. 10-2003-0009521

(51) Int. Cl.
*G02B 6/44* (2006.01)
(52) U.S. Cl. ............... 385/113; 385/100; 385/103; 385/109
(58) Field of Classification Search ............... 385/100, 385/103, 105, 109–115
See application file for complete search history.

(56) References Cited

U.S. PATENT DOCUMENTS

| 6,115,522 | A  | * | 9/2000 | Tachikura et al. | .......... 385/102 |
| 6,249,629 | B1 | * | 6/2001 | Bringuier | ................... 385/113 |
| 2003/0091307 | A1 | * | 5/2003 | Hurley et al. | ............... 385/109 |
| 2003/0118300 | A1 | * | 6/2003 | Seddon et al. | .............. 385/111 |

FOREIGN PATENT DOCUMENTS

| JP | 03-141132 A | 6/1998 |
| JP | 10-003020 A | 6/1998 |
| JP | 10-160985 A | 6/1998 |

* cited by examiner

*Primary Examiner*—Frank G. Font
*Assistant Examiner*—Hung Lam
(74) *Attorney, Agent, or Firm*—Jones Day

(57) ABSTRACT

Disclosed is a loose tube optical cable having an unstranded structure, which includes a tensile strength member longitudinally elongated and having a central axis deviated from the center of the optical cable, a loose tube optical fiber unit longitudinally elongated without intended twist against the tensile strength wire, and a cable coating for wrapping an aggregation in which the tensile strength member and the loose tube optical fiber unit are straightly aggregated. By suitably selecting geometric parameters of the tensile strength member and the loose tube optical fiber unit, the center of mass of the aggregation is positioned within the tensile strength member and the maximum modulus of elongation of the optical fiber is restricted within a predetermined range in a predetermined bending radius.

18 Claims, 7 Drawing Sheets

CENTRAL COORDIHATE OF EACH CIRCLE

C1:(r,r)
C2:(3r,r)
C3:$(2r, \sqrt{(R+r)^2 - r^2} + r)$

CENTRAL COORDIHATE OF EACH CIRCLE

C1:(r,r)
C2:(r,2r+R)

LOOSE TUBE OPTICAL CABLE HAVING STRAIGHT AGGREGATION STRUCTURE

TECHNICAL FIELD

The present invention relates to a loose tube optical cable, and more particularly to a loose tube optical cable having an unstranded structure that has no inclusion for keeping an original form of the optical cable and has no intended twist of the loose tube on an outer circumference of a tensile strength member of the cable.

BACKGROUND ART

The optical fiber is generally classified into a loose tube optical cable and a ribbon slot optical cable depending on the structure of the optical cable core. Among them, the loose tube optical cable is configured so that a plurality of optical fiber units in which the required number of optical fibers are mounted in a plastic tube together with jelly compound (hereinafter, referred to as 'loose tube optical fiber unit') are stranded around a tensile strength member positioned at the center of the cable. At this time, a plurality of the loose tube optical fiber units are stranded around the tensile strength member in a helical or an SZ strand in order to minimize the stress caused to the optical fiber by the bending of the optical cable when the optical cable is installed or taken up around a drum.

More specifically, referring to FIG. 1, the conventional loose tube optical cable 10 includes a tensile strength member 20 for minimizing various stresses exerted to the optical cable 10 when the optical cable 10 is taken up around a drum or installed in or out of a building, a plurality of loose tube optical fiber units 30 longitudinally stranded by a helical or an SZ method around the tensile member 20, a cable coating 50 for surrounding an aggregation of the tensile strength member 20 and the optical fiber units 30 and protecting an optical fiber 40 in the optical cable 10 from an external force when the cable is installed (e.g., side pressure or pulling), an external force after the installation of the cable (e.g., dropping of an article, compressive breakdown due to an article) and external circumstances (e.g., penetration of water), and a filler 60 for filling a space in the cable coating 50 except the loose tube optical fiber units 30.

However, in case there are required a smaller number of loose tube optical fiber units 30 in the loose tube optical cable 10 having the structure as shown in FIG. 1, the remained space in the cable coating 50 is replaced with inclusions in order to focus the stress on the tensile strength member 20 by keeping the optical cable 10 in its original form and minimize the stress of the optical fiber by keeping the helical or SZ strand of the loose tube optical fiber units 30 around the tensile strength member 20.

For example, FIG. 2 shows an optical cable of 1+6 structure in which 6 loose tube optical fiber units 30 should be stranded around one tensile strength member 20. However, if there are needed only two optical fiber units 30, the remained four loose tube optical fiber units are substituted with inclusions 70.

However, if the optical cable is manufactured by replacing the unnecessary loose tube optical fiber units 30 with the inclusions 70 as shown in FIG. 2 since the required number of the loose tube optical fiber units 30 is small in the loose tube optical cable 10, there is needed a process for maintaining the loose tube optical fiber units 30 and the inclusions 70 to be helically or SZ twisted around the tensile strength member 20. In addition, since the diameter and weight of the optical cable are not reduced due to the inclusions, there are increased the costs for manufacturing, carrying and installing the optical cable.

DISCLOSURE OF INVENTION

The present invention is designed to solve the problems of the prior art, and therefore an object of the present invention is to provide a loose tube optical cable having an unstranded structure which may not require insertion of unnecessary inclusions, make the tensile stress be focused on the tensile strength member though the loose tube optical fiber units are not helically or SZ twisted around the tensile strength member, and minimize the stress caused to the optical fiber due to the bending of the cable.

In one aspect of the present invention, there is provided a loose tube optical cable having an unstranded structure, which includes a tensile strength member longitudinally elongated and having a central axis deviated from the center of the optical cable; a loose tube optical fiber unit longitudinally elongated without intended twist against the tensile strength member; and a cable coating for wrapping an aggregation in which the tensile strength member and the loose tube optical fiber unit are straightly aggregated, wherein the center of mass of the unstranded structure is positioned within the tensile strength member.

In the present invention, geometric parameters and properties of the tensile strength member and the loose tube optical fiber unit are preferably selected so that the center of mass of the aggregation is positioned within the tensile strength member.

In the present invention, in case the aggregation has one tensile strength member and one loose tube optical fiber unit, the tensile strength member and the optical fiber unit may have geometric parameters satisfying the following Equation 1:

$$2a < \frac{a^3 \rho_1 (2\gamma - \gamma^2) - \rho_2 (1 + 2a)}{a^2 \rho_1 (2\gamma - \gamma^2) - \rho_2} < 2(a+1) \qquad \text{Equation 1}$$

where $\alpha$ is a ratio of the radius of the loose tube optical fiber unit to a radius of the tensile strength member, $\rho_1$ and $\rho_2$ are densities of the loose tube optical fiber unit and the tensile strength member respectively, and $\gamma$ is a ratio of a thickness of the loose tube to a radius of the loose tube.

In case the aggregation has one tensile strength member and two loose tube optical fiber units, the tensile strength member and the optical fiber units may have geometric parameters satisfying the following Equation 2:

$$a - 1 + \sqrt{2a+1} < \qquad \text{Equation 2}$$
$$\frac{2a^3 \rho_1 (2\gamma - \gamma^2) + \rho_2 (a + \sqrt{1+2a})}{\rho_2 + 2a^2 \rho_1 (2\gamma - \gamma^2)} < a + 1 + \sqrt{2a+1}$$

where $\alpha$ is a ratio of the radius of the loose tube optical fiber unit to a radius of the tensile strength member, $\rho_1$ and $\rho_2$ are densities of the loose tube optical fiber unit and the tensile strength member respectively, and $\gamma$ is a ratio of a thickness of the loose tube to a radius of the loose tube.

In the present invention, it is important not to affect the prolonged reliability of the optical fibers when the optical cable is installed by means of adjusting the geometric parameters of the tensile strength member and the loose tube optical fiber unit.

Generally, the prolonged reliability of the optical fiber is not affected when the maximum bending radius of the optical cable is more than 20 times of the optical cable diameter and the maximum modulus of elongation of the optical fiber is not more than 0.3% during installing the optical cable.

Thus, in the present invention having the loose tube optical fiber unit, the prolonged reliability of the optical fiber may be ensured when the maximum modulus of elongation of the optical fiber is not more than 0.3% at the maximum bending radius of the optical cable (equal to 20 times of the optical cable diameter) even though not helically nor SZ twisting the loose tube optical fiber unit around the tensile strength member.

Therefore, the loose tube optical cable of 1+2 structure or 1+1 structure selects the geometric parameters of the tensile strength member and the loose tube optical fiber unit to satisfy the following Equation 3 so that the maximum modulus of elongation of the optical fiber may be restricted not more than 0.3% when the maximum bending radius of the optical cable is 20 times of the optical cable diameter.

$$\frac{R-r+t+\frac{d}{2}}{40(R+r)} \leq 0.003 \quad \text{Equation 3}$$

where R and r are radii of the tensile strength member and the loose tube optical fiber unit respectively, t is a thickness of the loose tube, and d is a diameter of the optical fiber inserted into the loose tube optical fiber unit wherein the number of used optical fiber is one or more. In case more than one optical fiber is used, d is calculated using the following equation:

$$2 \times (\text{diameter\_of\_optical\_fiber}) \times \frac{\sqrt{\text{number\_of\_optical\_fibers}}}{\pi}$$

In the present invention, the optical fiber mounted in the loose tube optical fiber unit is preferably installed in a plastic tube with an EFL (Excess Fiber Length) of 0.0~0.2%.

In addition, the loose tube optical cable of the present invention may also include a binder for binding the aggregation in a longitudinal direction, and filler for preventing penetration of water, which is interposed between the cable coating and the aggregation.

BRIEF DESCRIPTION OF THE DRAWINGS

Other objects and aspects of the present invention will become apparent from the following description of embodiments with reference to the accompanying drawing in which.

BEST MODES FOR CARRYING OUT THE INVENTION

Figure 1:
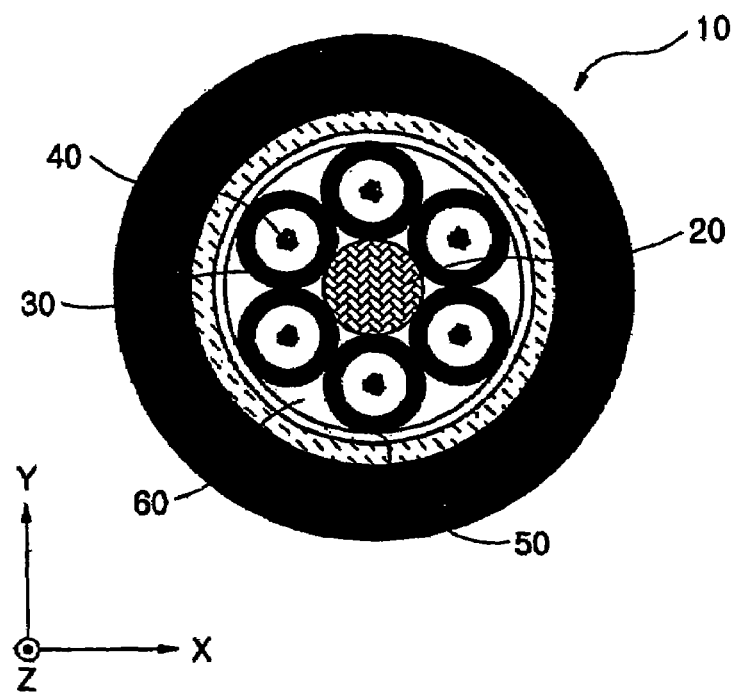
FIG. 1 is a sectional view showing a loose tube optical cable according to the prior art.
Figure 2:
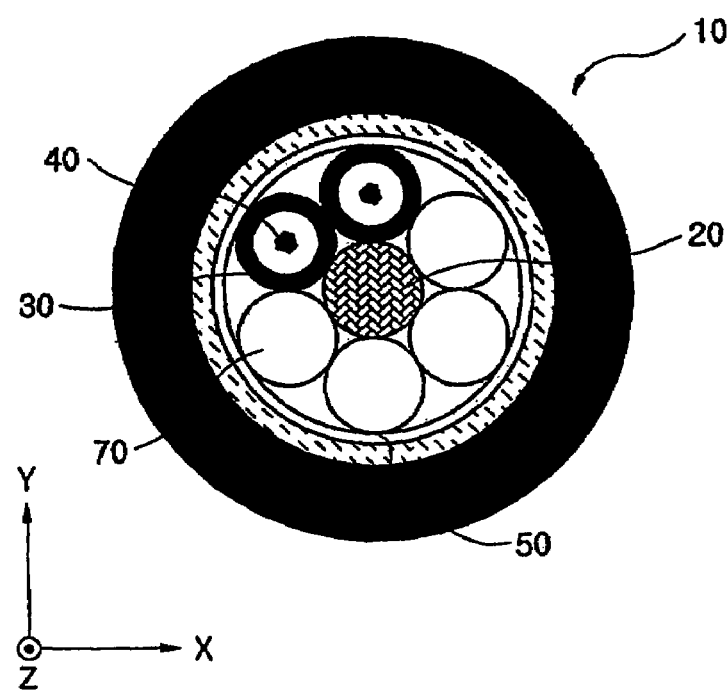
FIG. 2 is a sectional view showing a loose tube optical cable to which inclusions are inserted according to the prior art.

Hereinafter, the present invention will be described in more detail referring to the drawings. First of all, terms and words used in the specification and the claims should be interpreted not in a limited normal or dictionary meaning, but to include meanings and concepts conforming with technical aspects of the present invention, based on the face that inventors may appropriately define a concept of a term to describe his/her own invention in a best way. Therefore, the configurations described in the specification and drawn in the figures are just most preferred embodiments of the present invention, not to show all of the technical aspects of the present invention. So, it should be understood that there might be various equalities and modifications to be replaced with them.

Figure 3:
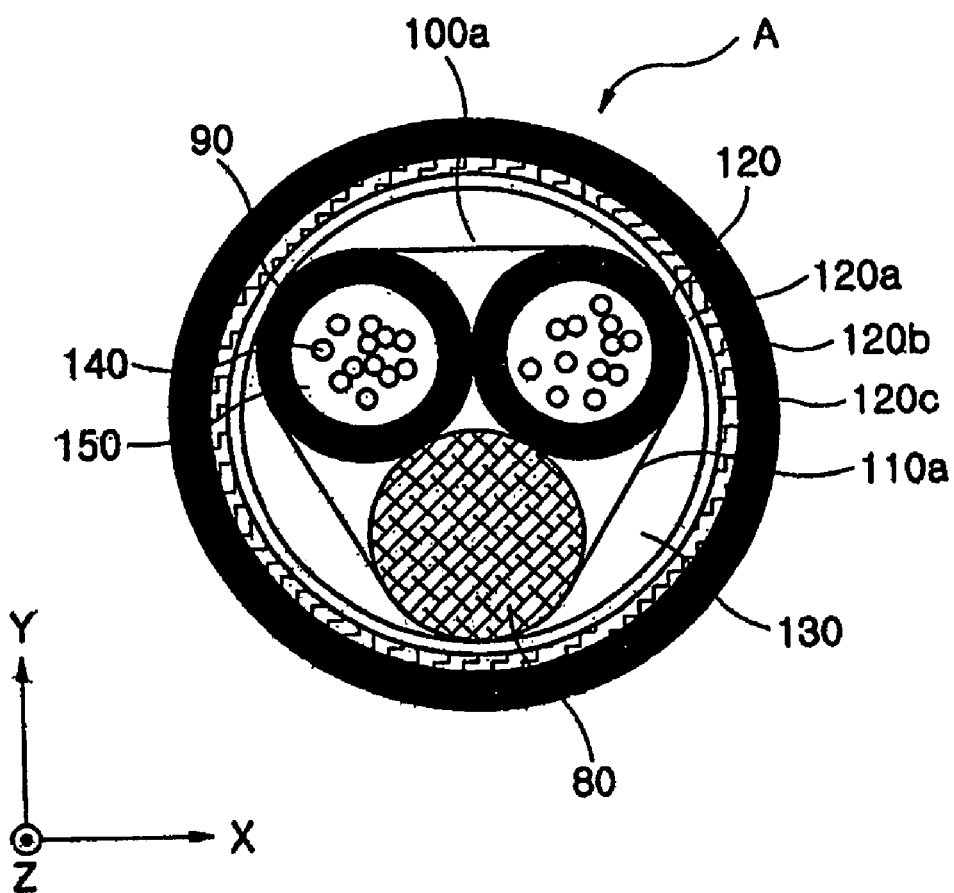
FIG. 3 is a sectional view showing a loose tube optical cable of 1+2 structure according to an embodiment of the present invention.
Figure 3:
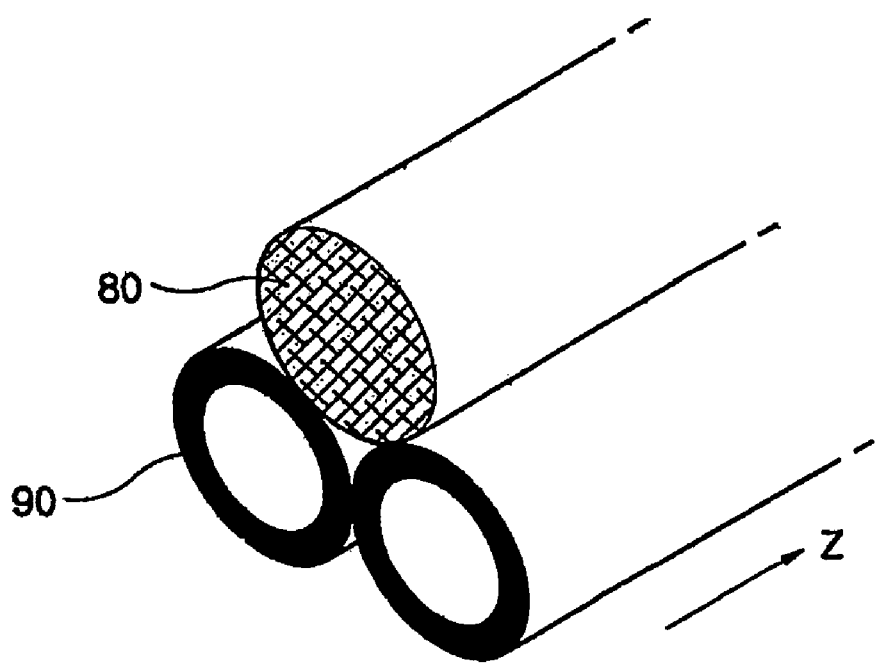
Figure 4:
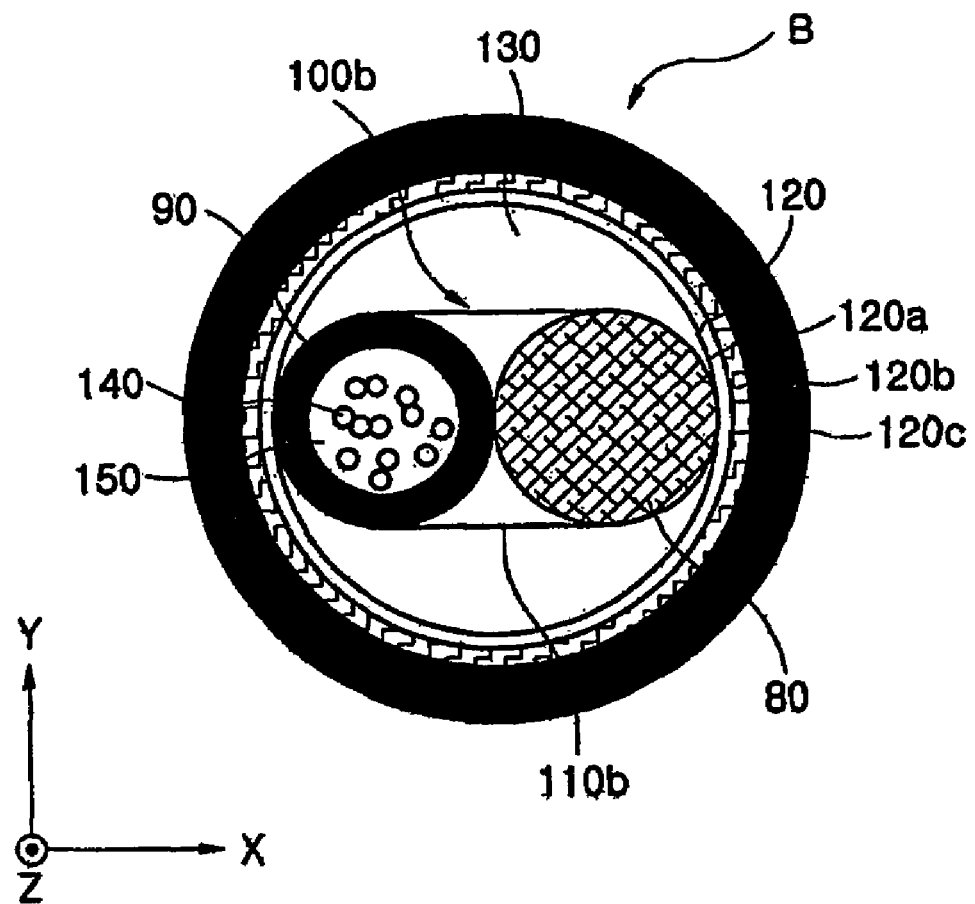
FIG. 4 is a sectional view showing a loose tube optical cable of 1+1 structure according to an embodiment of the present invention.
Figure 4:
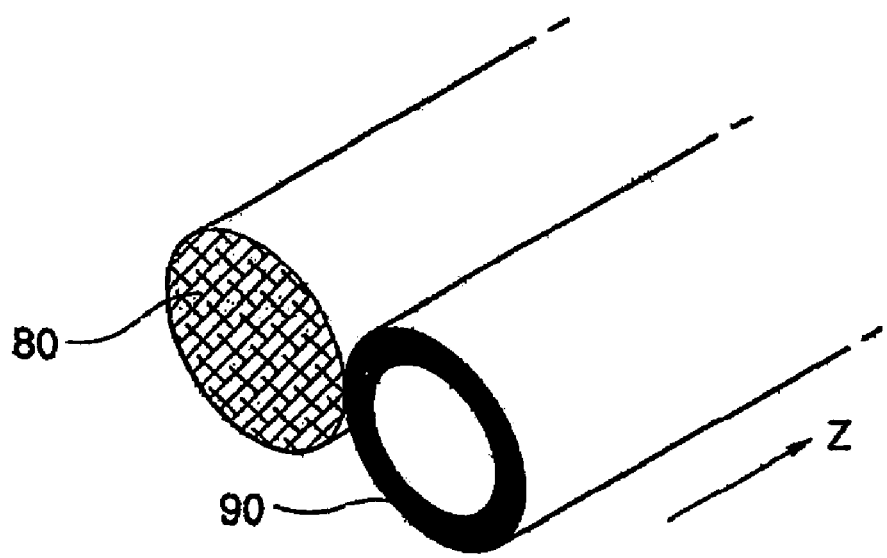

FIGS. 3 and 4 are sectional views showing loose tube optical cables respectively having 1+2 structure and 1+1 structure according to embodiments of the present invention. Here, "1+2 structure" means a structure in which one tensile strength member and two loose tube optical fiber units are aggregated, while "1+1 structure" means a structure in which one tensile strength member and one loose tube optical fiber unit are aggregated.

Referring to FIGS. 3 and 4, the loose tube optical cable A or B according to an embodiment of the present invention includes a tensile strength member 80 elongated to a longitudinal direction (or, a Z-direction) and having a central axis deviated from the center of the optical cable A or B, at least one loose tube optical fiber unit 90 elongated to the longitudinal direction (or, the Z-direction) without intended helical or SZ twist around the tensile strength member 80, a binder 110a or 110b for binding an aggregation 100a or 100b so that the tensile strength member 80 and the loose tube optical fiber unit 90 are aggregated therein in an unstranded structure, a cable coating 120 for wrapping the unstranded structure 100a or 100b bound by the binder 110a or 110b, and a filler 130 interposed between the aggregation 100a or 100b and the cable coating 120.

In an embodiment of the present invention, the loose tube optical fiber unit 90 is structured so that a predetermined number of optical fibers 140 are received in filler 150 filled in a plastic tube for preventing penetration of water. In this embodiment, the filler 150 for preventing penetration of water may preferably adopt jelly compound or silicon oil, but not limited to those cases. However, the filler 150 for preventing penetration of water should ensure the optical fibers 140 to be capable of moving in the plastic tube.

In the loose tube optical fiber unit 90, the optical fiber 140 is preferably mounted in the plastic tube with an EFL (Excess Fiber Length) of 0.0~0.2%. In this case, though the loose tube optical fiber unit 90 is transformed to some degree, a resultant force is not exerted to the optical fiber 140, thereby preventing the light signal loss caused by external pressure.

The optical cable A or B according to the embodiment of the present invention basically does not have any unnecessary inclusion, so a central axis of the tensile strength member 80 and the center of mass of the cable are not incident with a central axis of the optical cable A or B. However, the optical cable A or B according to the present invention is configured so that the center of mass of the optical cable A or B is restricted within the tensile strength member 80 by selecting geometric parameters of the tensile strength member 80 and the loose tube optical fiber unit 90 to satisfy predetermined conditions described later. At this time, conditions of the geometric parameters are more specifically determined using properties of the tensile strength member 80 and the loose tube optical fiber unit 90, described later as well. As mentioned above, if the center of mass of the optical cable A or B is restricted within the tensile strength member 80 by endowing conditions to the geometric parameters, the force applied to the optical cable A or B may focus its point of application on the tensile strength member 80, thereby minimizing the effects influenced on the optical fibers received in the loose tube optical fiber unit 90.

In addition, since the optical cable A and B according to the embodiment of the present invention has the unstranded structure, the loose tube optical fiber unit 90 is not helically or SZ twisted. In this case, when the optical cable A or B is installed or taken up around a drum, a stress may be caused to the optical fibers 140 received in the loose tube optical fiber unit 90 and thereby deteriorate the characteristics of the optical fibers 140. In order to solve this problem, in the embodiment of the present invention, predetermined conditions are endowed to the geometric parameters of the tensile strength member 80 and the loose tube optical fiber unit 90 so that a maximum modulus of elongation of the optical fiber 140 may be not more than 0.3%, which is generally required for ensuring prolonged reliability of the optical cable A or B though the optical cable A or B is bent to have a radius as much as 20 times of the cable diameter, which is a maximum bending radius generally required for the optical cable A or B. These geometric parameters will be described later in detail with reference to FIGS. 7a, 7b and 8.

In the embodiment of the present invention, the tensile strength member 80 may use a Kevlar aramid yarn, a fiberglass epoxy rod, an FRP (Fiber glass Reinforced Plastics), a high-strength fiber, a steel or a steel wire. However, the present invention is not limited to those cases.

In the embodiment of the present invention, the cable coating 120 may have a three-layer structure having a taping layer 120a, a moisture-proof layer 120b made of a laminated aluminum tape, and an external sheath layer 120c made of polyethylene. In addition, the filler 130 may adopt jelly compound. However, it is apparent to those skilled in the art that the configuration of the cable coating 120 and the kind of the filler 130 may be variously changed in the well-known technical scope according to usage and installation environments of the optical cable. In some cases, the filler 130 may not be included in the optical cable A or B.

In the optical cable A or B according to the embodiment of the present invention as shown in FIGS. 3 and 4, the geometric parameter conditions for restricting the center of mass of the cable within the tensile strength member 80 are described below in detail, for each case of the loose tube optical cables A and B having 1+2 structure and 1+1 structure respectively.

Loose Tube Optical Cable Having 1+2 Structure

Figure 5:
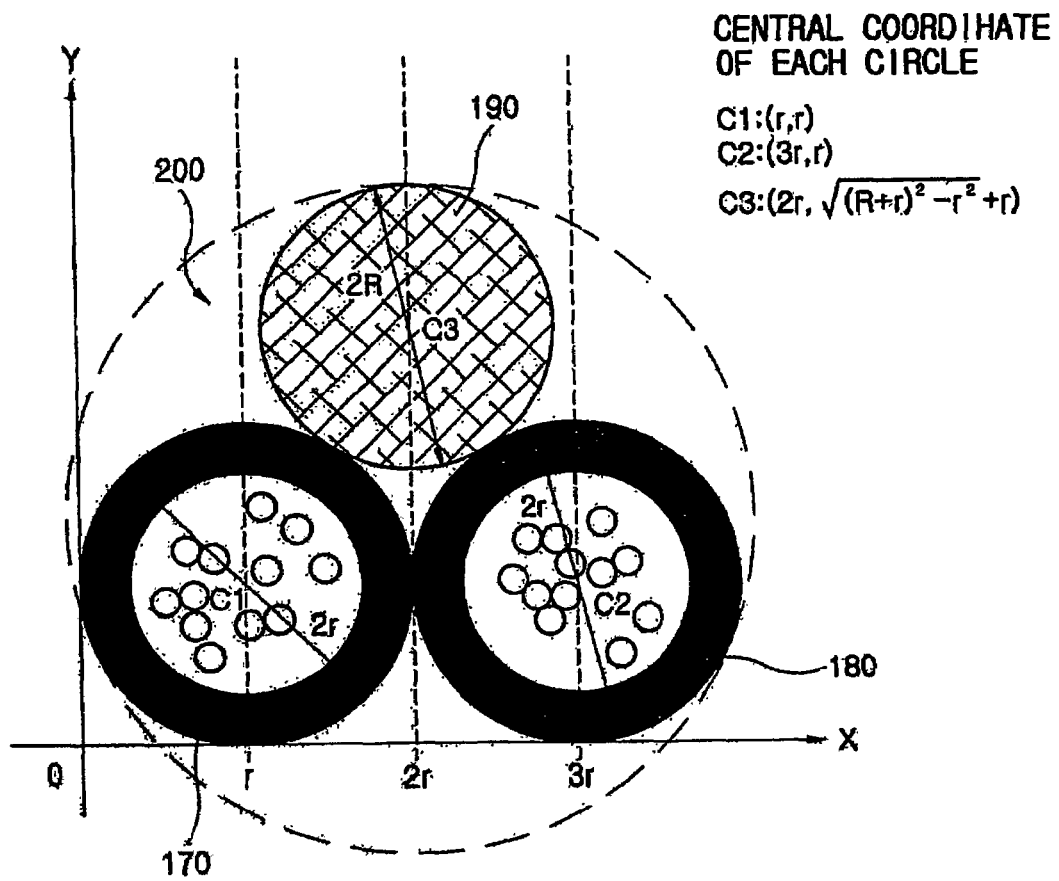
FIG. 5 is a sectional view showing an aggregation of 1+2 structure aggregated in an unstranded structure according to an embodiment of the present invention based on the X-Y coordinate system.

FIG. 5 is a sectional view showing an aggregation 200 in which first and second loose tube optical fiber units 170 and 180 having a mass m and a radius r and a tensile strength member 190 having a mass M and a radius R are aggregated in a straight structure, on a X-Y coordinate system.

In the loose tube optical cable having 1+2 structure as shown in FIG. 5, a central coordinate C1 of the tensile strength member 190 and each central coordinate C2 and C3 of the first and second loose tube optical fiber units 170 and 180 may be expressed as follows.

C1:(r,r)

C2:(3r,r)

C3:(2r, $\sqrt{(R+r)^2-r^2}$+r)

When a position of the center of mass of the aggregation 200 is $C_{CM}$ ($x_{CM}$, $y_{CM}$), a coordinate of the center of mass of the aggregation 200 may be calculated using the above central coordinates C1, C2 and C3 as follows.

$$C_{CM}(x_{CM}, y_{CM}) = \frac{\sum_i m_i \cdot r_i}{\sum_i m_i}$$

$$x_{CM} = \frac{mr + 3mr + 2RM}{M + 2m} = \frac{4mr + 2RM}{M + 2m} = 2r \quad (1)$$

$$y_{CM} = \quad (2)$$
$$\frac{mr + mr + M\left(\sqrt{(R+r)^2 - r^2} + r\right)}{M + 2m} = \frac{2mr + M\left(\sqrt{(R+r)^2 - r^2} + r\right)}{M + 2m}$$

On the other hand, if it is defined that the first and second loose tube optical fiber units 170 and 180 have a tube thickness t, which is γ times of a tube radius r, the tube thickness t may be expressed as γr (but, 0<γ<0.5). In this case, when the first and second loose tube optical fiber units 170 and 180 have a density $\rho_1$ and the tensile strength member 190 has a density $\rho_2$, the masses m and M may be expressed as below with the use of r, R, $\rho_1$ and $\rho_2$.

$$m = r^2\pi(2\gamma - \gamma^2)\rho_1 \quad (3)$$

$$M = R^2\pi\rho_2 \quad (4)$$

If substituting Equations (3) and (4) related to the masses m and M into Equations (1) and (2) related to the center of mass coordinates and replacing r with $\alpha \cdot R$ ($r=\alpha \cdot R$), the center of mass coordinates may be arranged as follows.

$$x_{CM} = 2\alpha R \quad (5)$$

$$y_{CM} = \frac{2a^3 R \rho_1 (2\gamma - \gamma^2) + \rho_2 (aR + \sqrt{1+2a}\, R)}{\rho_2 + 2a^2 \rho_1 (2\gamma - \gamma^2)} \quad (6)$$

If it is determined that the center of mass of the aggregation 200 is positioned within the tensile strength member 190, the center of mass of the optical cable is also restricted within the tensile strength member 190. In this reason, the center of mass coordinate of the aggregation 200 should be positioned in a boundary of the tensile strength member 190. This condition may be accomplished when the Equations (5) and (6) expressing the center of mass coordinates satisfy the following Equations (7) and (8).

$$2r - R < x_{CM} < 2r + R \quad (7)$$

$$R(\alpha + \sqrt{2\alpha+1}) - R < y_{CM} < R(\alpha + \sqrt{2\alpha+1}) + R \quad (8)$$

If substituting Equations (5) and (6) into Equations (7) and (8) and replacing r with $\alpha \cdot R$ ($r=\alpha \cdot R$), Equations (7) and (8) are arranged as follows and then the geometric parameter conditions may be generated.

$$R(2a-1) < 2aR < R(2a+1) \to a - \frac{1}{2} < a < a + \frac{1}{2} \quad (7')$$

$$R(a + \sqrt{2a+1}) - R <$$
$$\frac{2a^3 R \rho_1 (2\gamma - \gamma^2) + \rho_2 (aR + \sqrt{1+2a}\, R)}{\rho_2 + 2a^2 \rho_1 (2\gamma - \gamma^2)} < R(a + \sqrt{2a+1}) + R$$

if divided by R, $$(a - 1 + \sqrt{2a+1}) < \quad (8')$$
$$\frac{2a^3 \rho_1 (2\gamma - \gamma^2) + \rho_2 (a + \sqrt{1+2a})}{\rho_2 + 2a^2 \rho_1 (2\gamma - \gamma^2)} < a + 1 + \sqrt{2a+1}$$

Equation (7)' is always satisfied since $\alpha$ is larger than 0. Thus, when the densities $\rho_1$ and $\rho_2$ of the tensile strength member 190 and the first and second loose tube optical fiber units 170 and 180 are given, the loose tube optical cable of which the center of mass is restricted within the tensile strength member 190 according to the present invention may be realized by suitably selecting the radius ratio $\alpha$, which is a geometric parameter between the tensile strength member 190 and the loose tube optical fiber units 170 and 180, and the thickness ratio $\gamma$ of the loose tube to the loose tube radius to satisfy Equation (8)'.

For example, in case the tensile strength member 190 is FRP (Fiber glass Reinforced Plastics: $\rho_2$ is 1.7 kg/m$^3$); the loose tube is PP (Polypropylene: $\rho_1$ is 0.88 kg/m$^3$); and $\gamma=0.05$, the center of mass of the optical cable is positioned within the tensile strength member 190 if the geometric parameter a satisfies the range $0<\alpha<2.68$. In addition, if $\gamma$ and the kind of the tensile strength member 190 are identical to the above condition and the loose tube is PBT (Polybutyleneterephthalate: $\rho_1=1.31$ kg/kg/m$^3$), the center of mass of the optical cable is restricted within the tensile strength member 190 if the geometric parameter $\alpha$ satisfies the range $0<\alpha<2.23$.

Loose Tube Optical Cable Having 1+1 Structure

Figure 6:
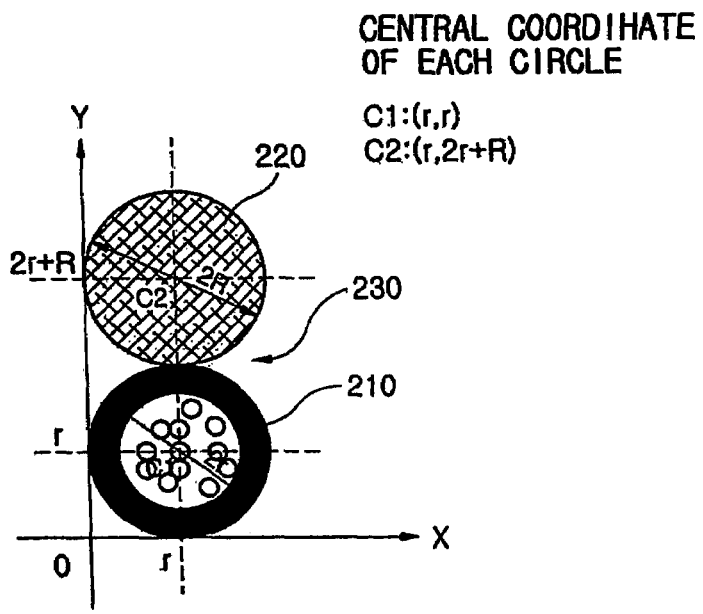
FIG. 6 is a sectional view showing an aggregation of 1+1 structure aggregated in an unstranded structure according to an embodiment of the present invention based on the X-Y coordinate system.

FIG. 6 is a sectional view showing an aggregation 230 in which a loose tube optical fiber unit 210 having a mass m and a radius r and a tensile strength member 220 having a mass M and a radius R are aggregated in a straight structure, on a X-Y coordinate system.

In the loose tube optical cable having 1+1 structure as shown in FIG. 6, a central coordinate C1 of the loose tube optical fiber unit 210 and a central coordinate C2 of the tensile strength member 220 may be expressed as follows.

C1:(r,r)

C2:(r,2r+R)

When a position of the center of mass of the aggregation 230 is $C_{CM}(X_{CM}, y_{CM})$, the coordinate of the center of mass of the aggregation 230 may be calculated using the above central coordinates C1 and C2 as follows.

$$C_{CM}(x_{CM}, y_{CM}) = \frac{\sum_i m_i \cdot r_i}{\sum_i m_i}$$

$$x_{CM} = \frac{mr + MR}{M + m} = r \quad (9)$$

$$y_{CM} = \frac{mr + M(R + 2r)}{M + m} \quad (10)$$

On the other hand, if it is defined that the loose tube optical fiber unit 210 has a tube thickness t, which is $\gamma$ times of a tube radius r, the tube thickness t may be expressed as $\gamma r$ (but, $0<\gamma<0.5$). In this case, when the loose tube optical fiber unit 210 has a density $\rho_1$ and the tensile strength member 220 has a density $\rho_2$, the masses m and M may be expressed as below with the use of r, R, $\rho_1$ and $\rho_2$.

$$m = r^2 \pi (2\gamma - \gamma^2) \rho_1 \quad (11)$$

$$M = R^2 \pi \rho_2 \quad (12)$$

If substituting Equations (11) and (12) related to the masses m and M into Equations (9) and (10) related to the center of mass coordinate and replacing r with $\alpha \cdot R$ ($r=\alpha \cdot R$), the center of mass coordinate may be arranged as follows.

$$x_{CM} = 2aR \quad (13)$$

$$y_{CM} = \frac{a^3 R \rho_1 (2\gamma - \gamma^2) - R \rho_2 (1 + 2a)}{a^2 \rho_1 (2\gamma - \gamma^2) - \rho_2} \quad (14)$$

If it is determined that the center of mass of the aggregation 230 is positioned within the tensile strength member 220, the center of mass of the optical cable is also restricted within the tensile strength member 220. In this reason, the center of mass coordinate of the aggregation 230 should be positioned in the boundary of the tensile strength member 220. This condition may be accomplished when the Equations (13) and (14) expressing the center of mass coordinates satisfy the following Equations (15) and (16).

$$r - R < x_{CM} < r + R \quad (15)$$

$$2\alpha R < y_{CM} < 2(\alpha+1)R \quad (16)$$

If substituting Equations (13) and (14) into Equations (15) and (16) and replacing r with $\alpha \cdot R$ ($r=\alpha \cdot R$), Equations (15)

and (16) are arranged as follows and then the geometric parameter conditions may be generated.

$$R(a-1) < aR < R(a+1) \rightarrow a-1 < a < a+1 \quad (15)'$$

$$2aR < \frac{a^3 R\rho_1(2\gamma-\gamma^2) - R\rho_2(1+2a)}{a^2\rho_1(2\gamma-\gamma^2) - \rho_2} < 2(a+1)R$$

if divided by R, $$2a < \frac{a^3\rho_1(2\gamma-\gamma^2) - \rho_2(1+2a)}{a^2\rho_1(2\gamma-\gamma^2) - \rho_2} < 2(a+1) \quad (16)'$$

Equation (15)' is always satisfied since α is larger than 0. Thus, when the densities $\rho_1$ and $\rho_2$ of the loose tube optical fiber unit 210 and the tensile strength member 220 are given, the loose tube optical cable of which the center of mass is restricted within the tensile strength member 220 according to the present invention may be realized by suitably selecting the radius ratio α, which is a geometric parameter between the tensile strength member 220 and the loose tube optical fiber unit 210, and the thickness ratio γ of the loose tube to the loose tube radius to satisfy Equation (16)'.

For example, in case the tensile strength member is FRP (Fiber glass Reinforced Plastics: $\rho_2$ is 1.7 kg/m³); the loose tube is PP (Polypropylene: $\rho_1$ is 0.88 kg/m³); and γ=0.05, the center of mass of the optical cable is positioned within the tensile strength member 220 if the geometric parameter α satisfies the range 0<α<2.71. In addition, if γ and the kind of the tensile strength member 220 are identical to the above condition and the loose tube is PBT (Polybutyleneterephthalate: $\rho_1$=1.31 kg/kg/m³), the center of mass of the optical cable is restricted within the tensile strength member if the geometric parameter α satisfies the range 0<α<2.37.

Hereinbefore, the embodiments of the loose tube optical cables having 1+2 structure and 1+1 structure in which the center of mass of the unstranded structure is positioned within the tensile strength member are described. However, it is apparent to those skilled in the art that the technical aspect of the present invention may be applied to other loose tube optical cables having, for example, 1+3 structure or 1+4 structure, not limited to those cases.

On the other hand, the optical cable of the present invention does not have the aggregation structure in which the loose tube optical fiber unit is helically or SZ twisted around the tensile strength member, as mentioned above. Thus, when the optical cable is installed or taken up around a drum, a stress may be applied to the optical fiber of the loose tube optical fiber unit due to the bending of the cable, which may cause deterioration of the characteristics of the optical fiber. In order to solve this problem, the embodiment of the present invention endows predetermined conditions to the geometric parameters of the tensile strength member and the loose tube optical fiber unit so that a maximum modulus of elongation of the optical fiber may not exceed 0.3%, which is generally required for ensuring prolonged reliability of the optical cable though the optical cable is bent to have a radius as much as 20 times of the cable diameter, which is a maximum bending radius generally required for the optical cable.

The geometric parameter conditions required for satisfying the elongation condition at the maximum bending radius may be calculated as follows for the loose tube optical cable according to the present invention.

Figure 7A:
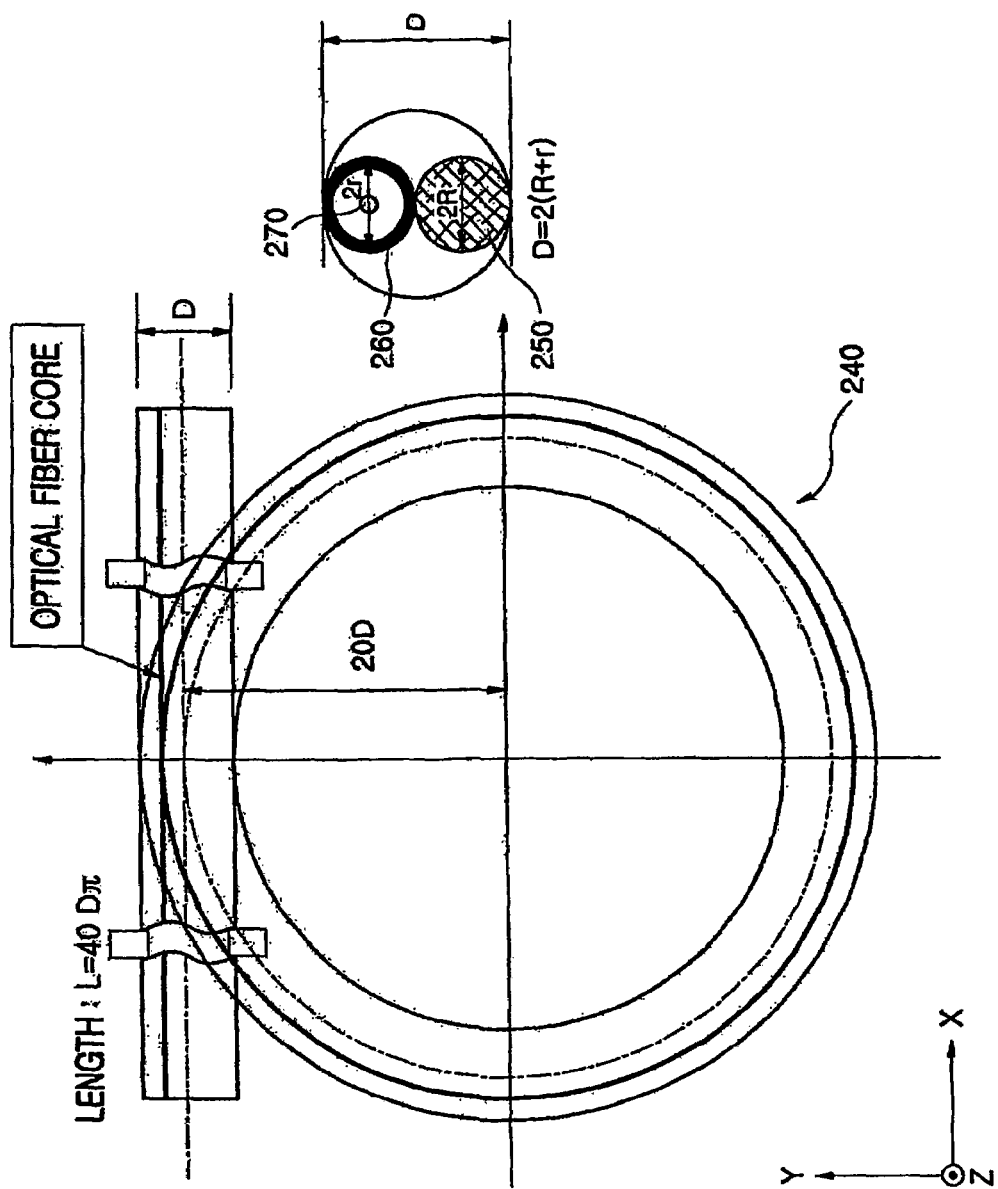
FIG. 7a is a diagram used for calculating conditions of geometric parameters to restrict an elongation of an optical fiber within a certain range in the loose tube optical cable of 1+1 structure according to an embodiment of the present invention.

Referring to FIG. 7a, in the loose tube optical cable 240 having 1+1 structure according to the present invention, the following Equation (17) should be satisfied in order that a maximum modulus of elongation of the optical cable 240 becomes not more than 0.3% when the maximum bending radius is 20D.

$$\Delta L = \frac{L_{bending} - L_{initial}}{L_{initial}} \leq 0.003 \quad (17)$$

Here, $L_{bending}$ is a length of the optical fiber 270 mounted in the loose tube of the optical fiber 240 when the maximum bending radius is 20D, while $L_{initial}$ is a length of the optical cable 240 itself. Thus, $L_{bending}$ and $L_{initial}$ may be expressed using the following Equations (18) and (19).

$$L_{bending} = 2(20D + 1/2D - r)\pi \leftarrow D = 2(R+r) \quad (18)$$
$$= 2(40(R+r) + R)\pi$$

$$L_{initial} = 2(20D)\pi \leftarrow D = 2(R+r) \quad (19)$$
$$= 80(R+r)\pi$$

Figure 7B:
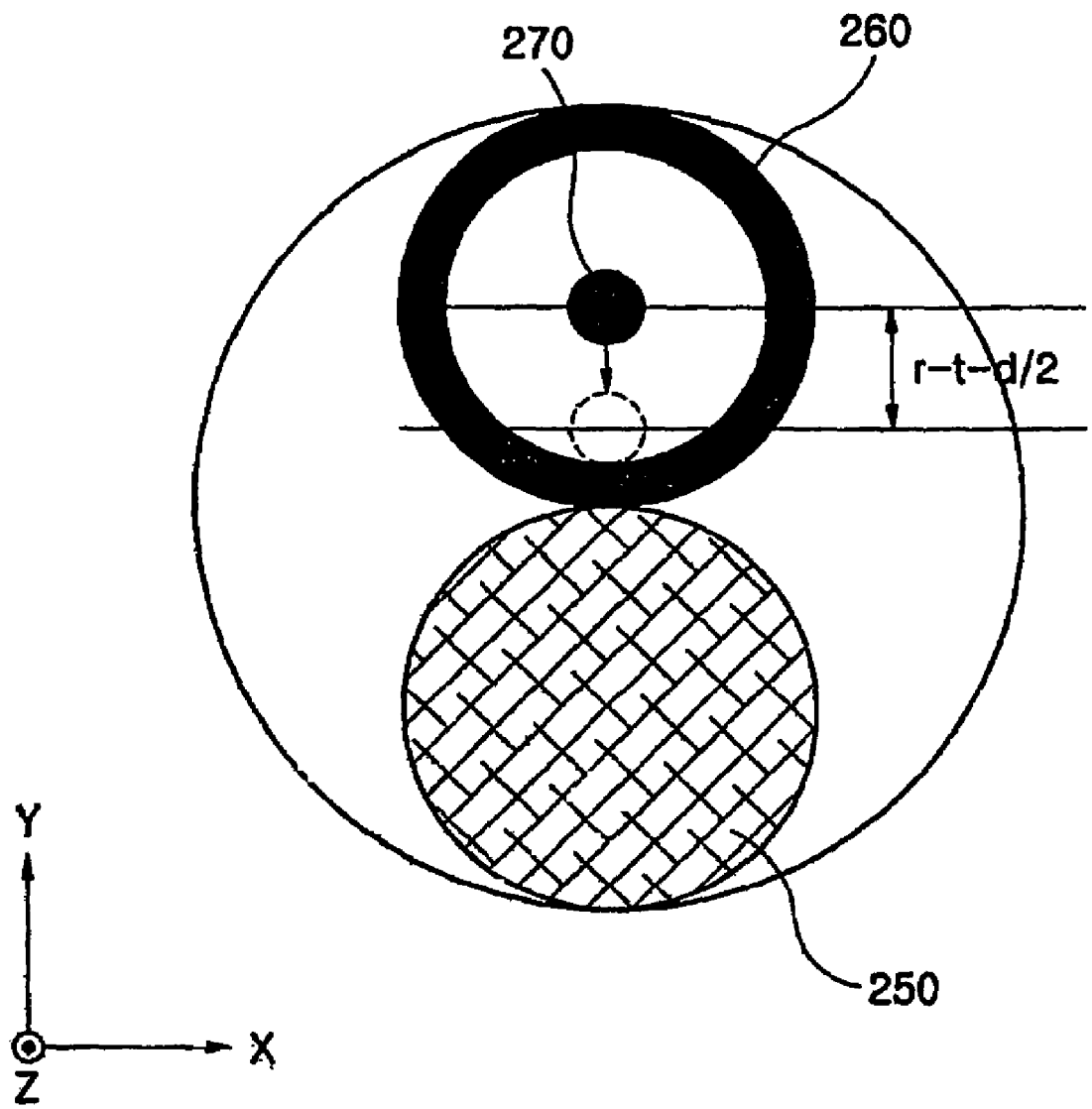
FIG. 7b is a diagram used for calculating a travel distance of the optical fiber within the loose tube in the loose tube optical cable of 1+1 structure according to an embodiment of the present invention.

However, since the optical fiber 270 is installed to move free in the loose tube as mentioned above, it may move within a space as much as (r-d)/(2-t) in the loose tube, as shown in FIG. 7b. Thus, the above Equation (18) is changed into the following Equation (18)'. Here, d is a diameter of the optical fiber, and t is a thickness of the loose tube.

$$L_{bending} = 2(40(R+r) + R - \text{'movable distance of the} \quad (18)'$$
$$\text{optical fiber'})\pi$$
$$= 2\left(40(R+r) + R - \left(r - t - \frac{d}{2}\right)\right)\pi$$

If substituting the Equations (18)' and (19) into the Equation (17), the geometric parameter conditions of the tensile strength member 250 and the loose tube optical fiber unit 260 for maintaining the maximum modulus of elongation of the optical fiber 270 not more than 0.3% when the maximum bending radius of the optical cable 240 is 20D are calculated as the following Equation (20).

$$\frac{R - r + t + \frac{d}{2}}{40(R+r)} \leq 0.003 \quad (20)$$

If the loose tube optical cable of the present invention is realized by selecting the geometric parameters of the tensile strength member 250 and the loose tube optical fiber unit 260 to satisfy the above conditions, the stress exerted to the optical fiber by the bending may be minimized without helically or SZ twisting the loose tube around the tensile strength member 250.

Figure 8:
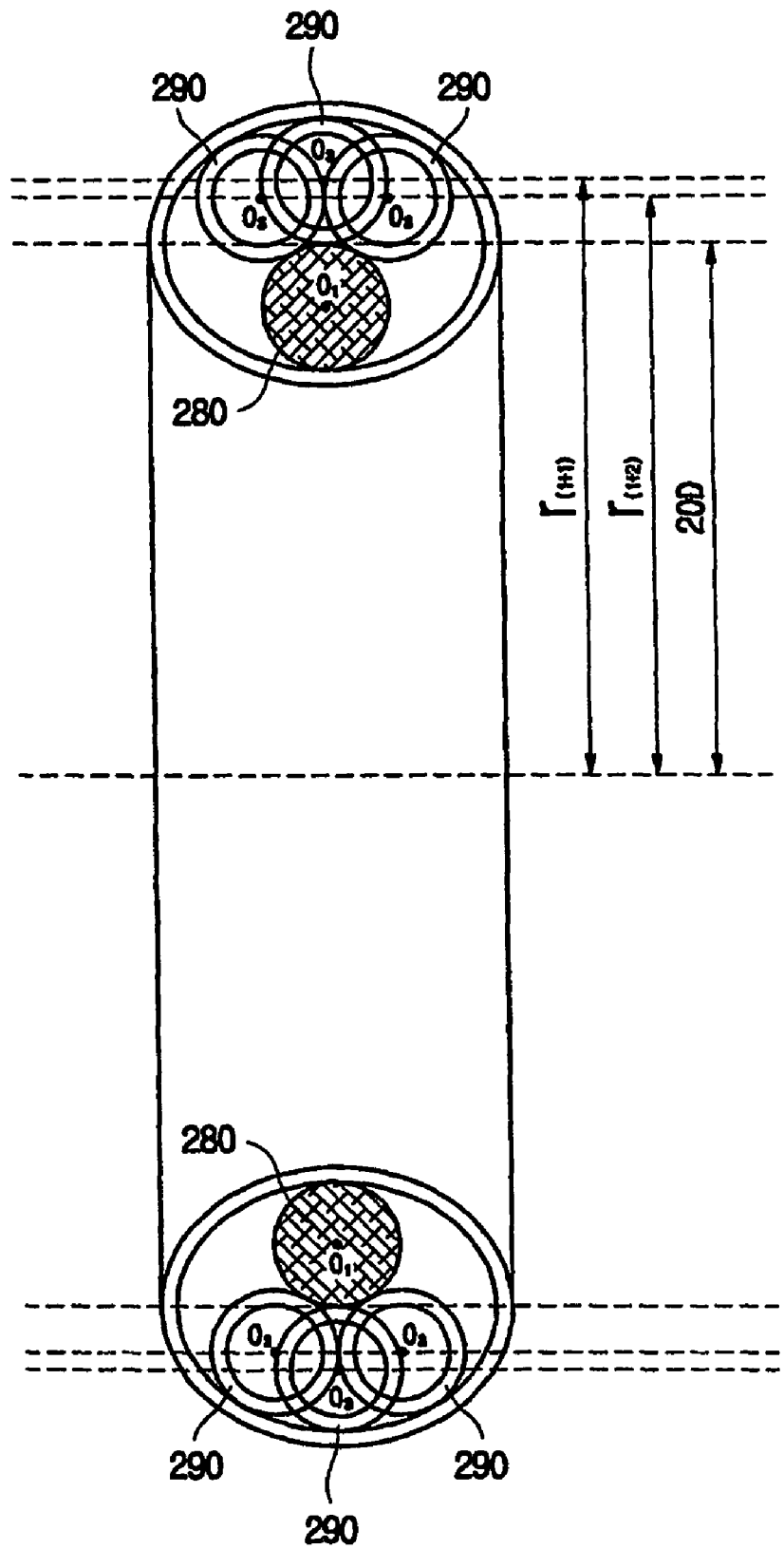
FIG. 8 is a diagram used for calculating conditions of geometric parameters to restrict an elongation of an optical fiber within a certain range in the loose tube optical cable of 1+2 structure according to an embodiment of the present invention.

Referring to FIG. 8, the loose tube optical cable ($O_1$-$O_3$-$O_3$) having 1+2 structure according to the present invention has $2\pi r_{(1+2)}$ as a $L_{bending}$ value when the maximum bending radius is 20D. If the radii of the loose tube optical fiber unit 290 and the tensile strength member 280 are respectively identical to [1+1 structure ($O_1$-$O_2$)] and [1+2 structure ($O_1$-$O_3$-$O_3$)], the loose tube optical cable of 1+1 structure has $2\pi r_{(1+1)}$ as a $L_{bending}$ value. However, since $r_{(1+2)}$ is smaller than $r_{(1+1)}$, the loose tube optical cable of 1+2 structure has a smaller $L_{bending}$ value than the loose tube optical cable of 1+1 structure. Thus, if the geometric parameters of the tensile strength member 280 and the loose tube optical fiber unit 290 of the loose tube optical cable satisfy the above-described Equation (20), the maximum modulus of elongation of the optical fiber is automatically restricted within 0.3% even in the loose tube optical cable of 1+2 structure when the maximum bending radius is 20D. This will be understood more clearly using the following Equation (21).

$$\frac{L_{bending(1+2)} - L_{initial(1+2)}}{L_{initial(1+2)}} \leq \frac{L_{bending(1+1)} - L_{initial(1+1)}}{L_{initial(1+1)}} \leq 0.003 \quad (21)$$

where $L_{bending(1+2)} \leq L_{bending(1+1)}$, $L_{initial(1+2)} = L_{initial(1+1)}$.

As mentioned above, if the geometric parameters of the tensile strength member 280 and the loose tube optical fiber unit 290 in the loose tube optical cable having 1+2 structure are chosen such that the Equation (20) is satisfied, the stress caused to the optical fiber by the bending may be minimized without helically or SZ twisting the loose tube around the tensile strength member 280.

As described above, the present invention accomplishes its object by endowing predetermined conditions to the geometric parameters of the tensile strength member and the loose tube optical fiber unit so that the prolonged reliability of the optical fiber may be ensured when installing the optical cable. In a more preferred case, the prolonged reliability of the optical fiber may be further improved by using an optical fiber having an EFL (Excess Fiber Length) of 0.0~0.2% which is inserted into the loose tube optical fiber unit.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed-description;.

INDUSTRIAL APPLICABILITY

According to one aspect of the present invention, it is possible to minimize the stress applied to the optical cable by adjusting the geometric parameters of the tensile strength member and the loose tube optical fiber unit so that the center of mass of the optical cable is restricted within the tensile strength member. In addition, by restricting the maximum modulus of elongation of the optical fiber within a predetermined range at the maximum bending radius of the optical cable, the stress applied to the optical fibers included in the optical cable may be minimized without helically or SZ twisting the loose tube.

According to another aspect of the present invention, the tube aggregating process may be omitted since the loose tube optical fiber unit is not helically or SZ twisted around the tensile strength member. In addition, by removing the inclusions used for keeping an original shape of the cable, the optical cable manufacturing processes may be simplified and the cable may become smaller and lighter.

What is claimed is:

1. A loose tube optical cable having an unstranded aggregation comprising:
   (a) a tensile strength member longitudinally elongated and having a central axis deviated from the center of the optical cable;
   (b) a loose tube optical fiber unit longitudinally elongated without intended twist against the tensile strength member; and
   (c) a cable coating for wrapping an aggregation in which the tensile strength member and the loose tube optical fiber unit are straightly aggregated,
   wherein radius and density of the tensile strength member and the loose tube optical fiber unit as well as thickness of the loose tube optical fiber unit are selected so that the center of mass of the unstranded aggregation is positioned within the tensile strength member.

2. A loose tube optical cable having an unstranded aggregation according to claim 1,
   wherein the aggregation has one tensile strength member and one loose tube optical fiber unit.

3. A loose tube optical cable having an unstranded aggregation according to claim 2,
   wherein the tensile strength member and the optical fiber unit have geometric parameters satisfying the following Equation 1:

$$2a < \frac{a^3 \rho_1 (2\gamma - \gamma^2) - \rho_2 (1 + 2a)}{a^2 \rho_1 (2\gamma - \gamma^2) - \rho_2} < 2(a+1) \quad \text{Equation 1}$$

where $\alpha$ is a ratio of the radius of the loose tube optical fiber unit to a radius of the tensile strength member, $\rho_1$, and $\rho_2$ are densities of the loose tube optical fiber unit and the tensile strength member respectively, and $\gamma$ is a ratio of a thickness of the loose tube to a radius of the loose tube.

4. A loose tube optical cable having an unstranded aggregation according to claim 1,
   wherein the aggregation has one tensile strength member and two loose tube optical fiber units.

5. A loose tube optical cable having an unstranded aggregation according to claim 4,
   wherein the tensile strength member and the optical fiber units have geometric parameters satisfying the following Equation 2:

$$(a - 1 + \sqrt{2a+1}) < \frac{2a^3 \rho_1 (2\gamma - \gamma^2) + \rho_2 (a + \sqrt{1+2a})}{\rho_2 + 2a^2 \rho_1 (2\gamma - \gamma^2)} < a + 1 + \sqrt{2a+1} \quad \text{Equation 2}$$

where $\alpha$ is a ratio of the radius of the loose tube optical fiber unit to a radius of the tensile strength member, $\rho_1$ and $\rho_2$ are densities of the loose tube optical fiber unit and the tensile strength member respectively, and $\gamma$ is a ratio of a thickness of the loose tube to a radius of the loose tube.

6. A loose tube optical cable having an unstranded aggregation according to claim 1, further comprising a binder for binding the aggregation in a straight direction.

7. A loose tube optical cable having an unstranded aggregation according to claim 1, wherein filler for protecting penetration of water is interposed between the cable coating and the aggregation.

8. A loose tube optical cable having an unstranded aggregation according to claim 1,
wherein the loose tube optical fiber unit has an EFL (Excess Fiber Length) of 0.0~0.2%.

9. A loose tube optical cable having an unstranded aggregation comprising:
(a) a tensile strength member longitudinally elongated and having a central axis deviated from the center of the optical cable;
(b) a loose tube optical fiber unit longitudinally elongated without intended twist against the tensile strength member; and
(c) a cable coating for wrapping an aggregation in which the tensile strength member and the loose tube optical fiber unit are straightly aggregated,
wherein the center of mass of the unstranded structure is positioned within the tensile strength member, and geometric parameters of the tensile strength member and the loose tube optical fiber unit satisfy conditions so that the maximum modulus of elongation of the optical fiber is less than or equal to the predetermined value at a predetermined maximum bending radius,
wherein the maximum bending radius is 20 times the diameter of the optical cable, and
wherein the maximum modulus of elongation of the optical fiber is restricted to not more than 0.3%.

10. A loose tube optical cable having an unstranded aggregation according to claim 9,
wherein geometric parameters and properties of the tensile strength member and the loose tube optical fiber unit are selected so that the center of mass of the aggregation is positioned within the tensile strength member.

11. A loose tube optical cable having an unstranded aggregation according to claim 10,
wherein the aggregation has one tensile strength member and one loose tube optical fiber unit.

12. A loose tube optical cable having an unstranded aggregation according to claim 11,
wherein the tensile strength member and the optical fiber unit have geometric parameters satisfying the following Equation 3:

$$2a < \frac{a^3 \rho_1 (2\gamma - \gamma^2) - \rho_2 (1 + 2a)}{a^2 \rho_1 (2\gamma - \gamma^2) - \rho_2} < 2(a+1) \quad \text{Equation 3}$$

where $\alpha$ is a ratio of the radius of the loose tube optical fiber unit to a radius of the tensile strength member, $\rho_1$ and $\rho_2$ are densities of the loose tube optical fiber unit and the tensile strength member respectively, and $\gamma$ is a ratio of a thickness of the loose tube to a radius of the loose tube.

13. A loose tube optical cable having an unstranded aggregation according to claim 10,
wherein the aggregation has one tensile strength member and two loose tube optical fiber units.

14. A loose tube optical cable having an unstranded aggregation according to claim 13,
wherein the tensile strength member and the optical fiber units have geometric parameters satisfying the following Equation 4:

$$(a - 1 + \sqrt{2a+1}) < \frac{2a^3 \rho_1 (2\gamma - \gamma^2) + \rho_2 (a + \sqrt{1+2a})}{\rho_2 + 2a^2 \cdot \rho_1 (2\gamma - \gamma^2)} < a + 1 + \sqrt{2a+1}) \quad \text{Equation 4}$$

where $\alpha$ is a ratio of the radius of the loose tube optical fiber unit to a radius of the tensile strength member, $\rho_1$ and $\rho_2$ are densities of the loose tube optical fiber unit and the tensile strength member respectively, and $\gamma$ is a ratio of a thickness of the loose tube to a radius of the loose tube.

15. A loose tube optical cable having an unstranded aggregation according to claim 9,
wherein the geometric parameters of the tensile strength member and the loose tube optical fiber unit satisfy the following Equation 5:

$$\frac{R - r + t + \frac{d}{2}}{40(R+r)} \leq 0.003 \quad \text{Equation 5}$$

where R and r are radii of the tensile strength member and the loose tube optical fiber unit respectively, t is a thickness of the loose tube, and d is a diameter of the optical fiber inserted into the loose tube optical fiber unit wherein the number of used optical fiber is one or more, and in case more than one optical fiber is used, d is calculated using the following equation:

$$2 \times (\text{diameter\_of\_optical\_fiber}) \times \frac{\sqrt{\text{number\_of\_optical\_fibers}}}{\pi}.$$

16. A loose tube optical cable having an unstranded aggregation according to claim 9, further comprising a binder for binding the aggregation in a straight direction.

17. A loose tube optical cable having an unstranded aggregation according to claim 9,
wherein a filler for protecting penetration of water is interposed between the cable coating and the aggregation.

18. A loose tube optical cable having an unstranded aggregation according to claim 9,
wherein the loose tube optical fiber unit has an EFL (Excess Fiber Length) of 0.0~0.2%.

* * * * *